2,961,158
Patented Nov. 22, 1960

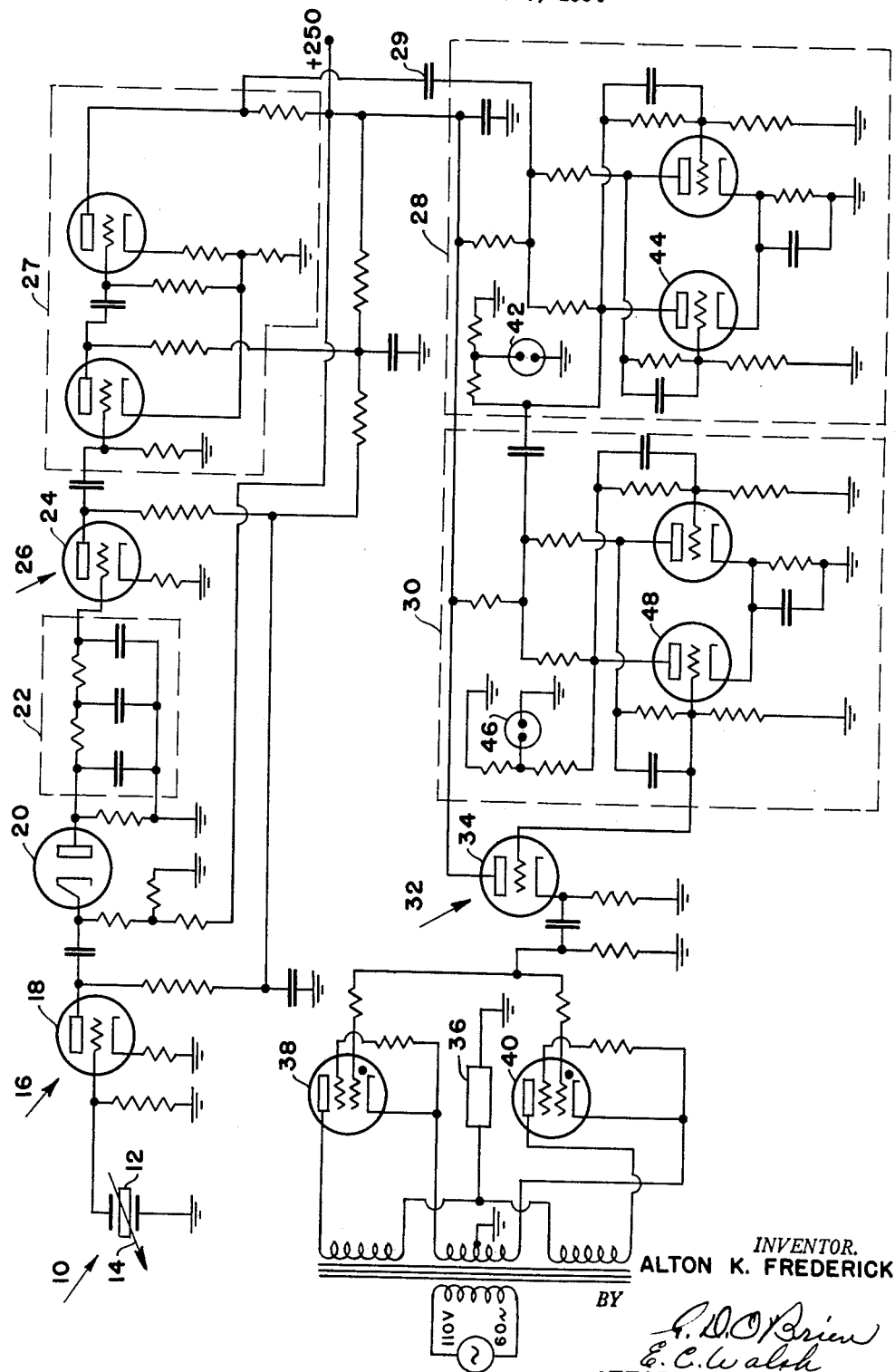

2,961,158

COUNTING DEVICE

Alton K. Frederick, 5352 W. Washington Blvd., Los Angeles 16, Calif.

Filed Feb. 3, 1954, Ser. No. 408,054

8 Claims. (Cl. 235—92)

(Granted under Title 35, U.S. Code (1952), sec. 266)

The invention described herein may be manufactured and used by or for the Government of the United States of America for governmental purposes without the payment of any royalties thereon or therefor.

This application is a continuation in part of my copending application Serial No. 316,330, filed October 22, 1952, and entitled "Toroidal Coil Winder," now U.S. Patent No. 2,850,247.

This invention relates to a counting device and in particular to a device for counting the number of turns of wire wound on a closed loop core, such as a toroidal core, by a toroidal coil winder, such as is disclosed in my above identified co-pending application.

It is obvious that the number of turns wound on a core must be accurately known. Previous counting devices for use with toroidal coil winders have been inaccurate over the wide range of speeds at which such cores are wound and have caused the wire being wound on such cores to break, particularly when the thinnest types of wire are used.

It is, therefore, an object of this invention to provide a counting device for coil winders which is accurate over the full range of speeds at which such winders may operate.

It is a further object of this invention to provide a counter for a coil winder which will not break the thinnest wire used.

Other objects and many of the attendant advantages of this invention will be readily appreciated as the same becomes better understood by reference to the following detailed description when considered in connection with the accompanying drawing wherein a schematic diagram of the counting device is illustrated.

As described in my co-pending application, a phonograph-type pickup 10 comprising a piezoelectric crystal 12 and needle 14 is mounted on an arm of a coil winder so that each time a turn of the wire being wound around the toroidal core is formed, the wire will pass beneath the end of needle 14 and a metal plate which the needle normally engages. Passage of the wire beneath needle 14 produces an A.C. signal across crystal 12. The mounting of the crystal and needle on the coil winder is fully disclosed in my co-pending above identified application. The A.C. signals developed across crystal 12 are amplified by the conventional amplifier circuit 16 which includes thermionic triode 18. The output of amplifier 16 is capacitatively coupled to the cathode of diode 20 so that only negative pulses are applied to low pass filter 22. The highest frequency passed by filter 22 is 80 cycles per second in a preferred example. The negative pulses passed through filter 22 are applied to the control grid of triode 24 of a second amplifier circuit 26. The phase of each pulse applied to amplifier 26 is shifted 180° so that a positive pulse is applied to the conventional one shot multivibrator 27 for every negative pulse applied to the grid of triode 24. For each positive pulse applied to multivibrator 27, it will produce a square shaped pulse which is applied to multivibrator 28 through condenser 29. The values of the R.C. networks in the grid circuits and the grid bias of the tubes of multivibrator 28 are such that multivibrator 28 will change its state responsive only to negative pulses from multivibrator 27. Multivibrator 28 produces a negative pulse for every two negative pulses applied to it from one shot multivibrator 27. The negative pulses from multivibrator 28 are applied to a second multivibrator 30 which is similar in construction and operation to multivibrator 28. For every two negative pulses applied to multivibrator 30 a positive pulse is produced which is applied to the cathode follower circuit 32 which includes conventional thermionic triode 34. Counter 36 is a solenoid actuated mechanical counter such as a "Veeder Root" which registers a count after being energized for more than a predetermined period of time by a current of more than a predetermined magnitude. The positive pulses from cathode follower 32 which are applied to thyratrons 38, 40 permit them to conduct so that pulsating D.C. current will flow through the solenoid of counter 36 to actuate it. Neon light 42 is connected to the plate of tube 44 of multivibrator 28, and neon light 46 is connected to the plate of tube 48 of multivibrator 30. The circuits are so arranged that lights 42, 46 are both off on the zero and fourth pulses applied to multivibrator 28 and integral multiples thereof. On the first pulse light 42 goes on. On the second pulse light 42 goes out and light 46 goes on. On the third pulse both lights 42, 46 are on, and on the fourth pulse they both go off.

In operation A.C. signals due to vibration, for example, as well as due to the passage of the wire past needle 14 appear across crystal 12. All of the signals across crystal 12 are amplified by amplifier 16. The signal due to the passage of the wire past needle 14, however, produces signals of the greatest amplitude. The highest frequency at which the wire passes needle 14 is determined by the maximum winding rate of the coil winder, which in a preferred example is approximately 80 turns per second, and this determines the highest frequency to be passed by filter 22. As a result of the action of diode 20 and filter 22 negative pulses are applied to amplifier 26 due to the passages of the wire past needle 14. The negative pulses from filter 22 and amplified by amplifier 26 and are applied as positive pulses to one shot multivibrator 27. The output of multivibrator 27 is a square shaped pulse. When the amplitude of the square pulse from multivibrator 27 goes from its maximum to its minimum value, a negative pulse is applied to multivibrator 28 which causes it to change its state. For every two negative pulses applied to multivibrator 28 a single negative pulse is applied to multivibrator 30 which acts in a similar manner. Multivibrator 30 is connected to cathode follower 32 so that for every two negative pulses applied to multivibrator 30 a positive pulse is applied to cathode follower 32. The positive pulses applied to the control grids of thyratrons 38, 40 by cathode follower 32 permit the thyratrons to conduct so that pulsating D.C. current flows through mechanical counter 36.

To initially set the counting device, needle 14 may be tapped the necessary number of times until both neon lights 46, 42 are off, or a conventional reset circuit can be connected to multivibrators 28, 30. Counter 36 is then set to zero by the normal resetting means incorporated in such counters. The number of turns wound on a core is then four times the number appearing on counter 36, plus zero, one, two or three as determined by which of neon lights 42, 46 are lit.

Obviously, many modifications and variations of the present invention are possible in the light of the above teachings. It is, therefore, to be understood that within the scope of the appended claims the invention may be practiced otherwise than as specifically described.

What is claimed is:

1. In a wire-coil winding machine wherein wire is paid out and traverses a fixed region a number of times corresponding to the number of turns wound by said machine, coil-turn counting apparatus comprising a phonograph-type pickup device adapted to be plucked by wire-traversal at said fixed region, circuit means connected to said pickup device and deriving from the generated output thereof electrical pulses corresponding in number to traversals of said region by the wire, and means responsive to said pulses and providing a count thereof.

2. Coil-turn counting apparatus as defined in claim 1, wherein said circuit means and last-mentioned means include amplifier means providing extreme sensitivity to wire contact at said pickup device.

3. Coil-turn counting apparatus as defined in claim 1, wherein said pickup device generates a series of voltage oscillations in response to each said wire-traversal, and wherein said circuit means includes means for converting said series of voltage oscillations to a unipolar pulse suitable for actuation of a digital counting apparatus.

4. In a wire-coil winding machine wherein wire is paid out and traverses a fixed region of number of times corresponding to the number of turns wound by said machine, in combination therewith, coil-turn counting apparatus comprising a phonograph-type pickup device adapted to be plucked by wire traversal at said fixed region, circuit means connected to said pickup device and deriving from the generated output thereof electrical pulses corresponding in number to traversals of said region by the wire, and means responsive to said pulses and providing a count thereof.

5. A combination as defined in claim 4, wherein said circuit means and last-mentioned means include amplifier means providing extreme sensitivity to wire contact at said pickup device.

6. A combination as defined in claim 4, wherein said pickup device generates a train of voltage oscillations in response to each said wire-traversal, and wherein said circuit means includes means adapted to convert the trains of oscillatory voltages generated by said pickup device into electrical pulses identifying said wire traversals.

7. In a coil winding machine of the type adapted to wind a flexible member about a closed loop member in a plurality of continuous coils, each coil extending transversely of a peripheral direction of the loop member, and wherein a ring shaped bobbin carrying a coiled supply of the flexible member is rotatably supported to pass through the loop member, a portion of the flexible member to be subsequently wound on the loop member extending between the bobbin and the loop member and having movement across a fixed point on a backing plate during the formation of each complete coil on the loop member, the improvements comprising a phonograph pick-up device having a needle with an end resiliently engaging the backing plate adapted to engage said portion and be separated from the backing plate when said portion passes said point, engagement of said portion with said end effecting a vibration in the pick up device and correspondingly an oscillation signal output therefrom, circuit means for converting each said oscillation signal to a single electrical pulse, and pulse totaling means including an electrical counting device, whereby the number of coils wound on the loop member may be counted.

8. Apparatus in accordance with claim 7 wherein said pick-up device is of the crystal type.

References Cited in the file of this patent

UNITED STATES PATENTS

| | | |
|---|---|---|
| 2,240,278 | Abbott | Apr. 29, 1941 |
| 2,302,081 | Weitmann | Nov. 17, 1942 |
| 2,344,217 | Reason et al. | Mar. 14, 1944 |
| 2,405,133 | Brown | Aug. 6, 1946 |
| 2,662,693 | Sivo et al. | Dec. 15, 1953 |
| 2,672,297 | Harder | Mar. 16, 1954 |
| 2,850,247 | Frederick | Sept. 2, 1958 |

FOREIGN PATENTS

| | | |
|---|---|---|
| 115,109 | New Zealand | May 5, 1942 |